Patented Nov. 28, 1939

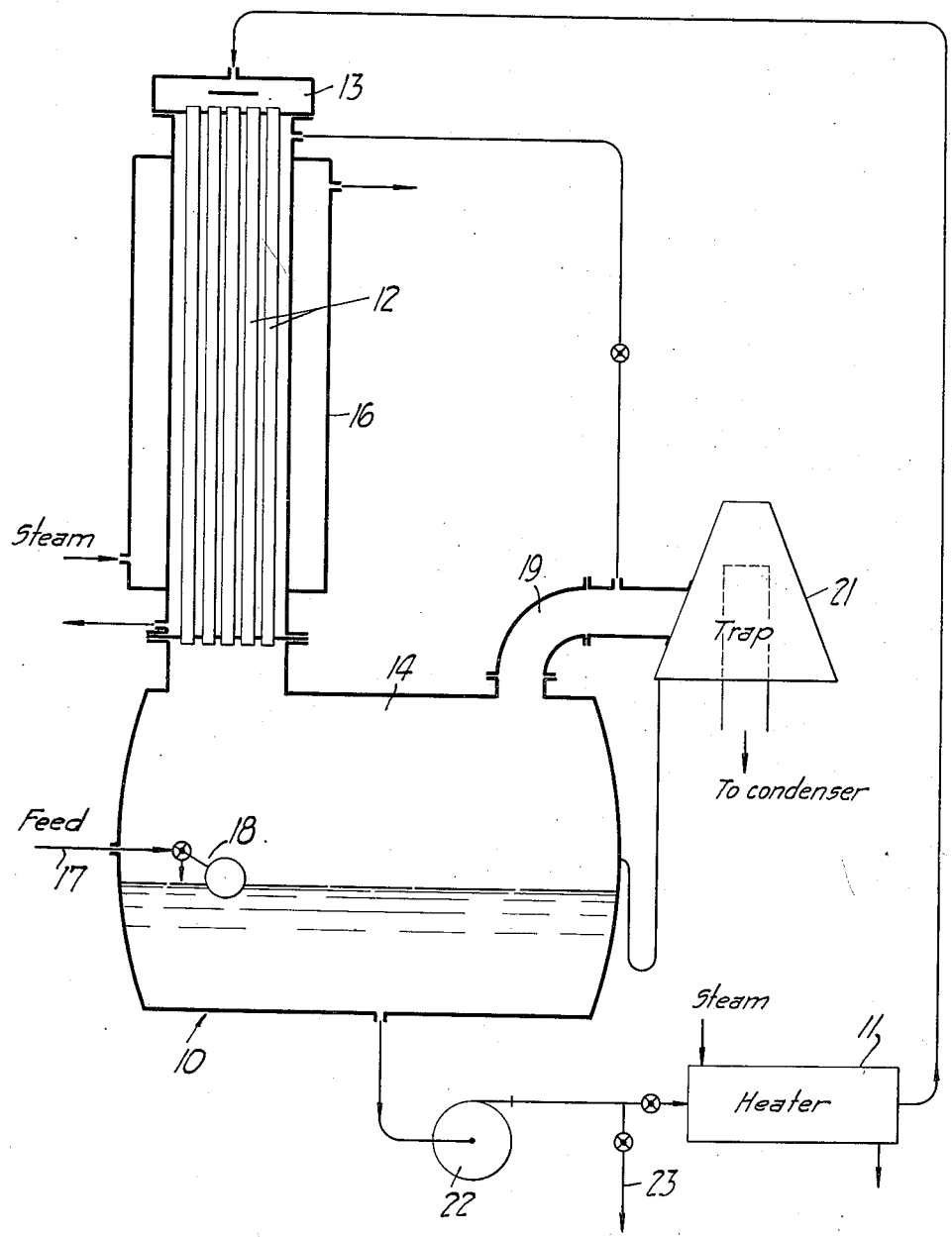

2,181,146

UNITED STATES PATENT OFFICE 2,181,146

PROCESS OF MANUFACTURING A NONCAKING DRIED WHEY POWDER

David D. Peebles, San Francisco, and Paul D. V. Manning, Berkeley Woods, Calif., assignors to Western Condensing Company, San Francisco, Calif., a corporation of California Application December 9, 1936, Serial No. 114,922

5 Claims. (Cl. 99—57)

This invention relates generally to processes for the manufacture of dried whey powder, suitable for animal or human food, wherein the powder is of such physical and chemical character that it will not cake when subjected to the usual storage and handling such as is common in the manufacture, sale and use of such a material.

In the past, dried whey powder has been prepared in several different forms, and by several different processes. The raw material available for commercial processing is liquid whey resulting from the manufacture of cheese or casein, by methods involving the use of rennet, mineral acid, lactic acid, or by permitting milk to sour. In the case of cheese whey, it is customary to remove butter fat left in the whey, usually at the cheese factory. With respect to casein whey, the casein is usually manufactured from skimmed milk, and therefore the whey produced contains substantially no fat. Large quantities of whey for processing are also available both as by-products from the manufacture of cottage cheese or cheeses of a like nature.

In general the proteins found in whey consist largely of lactalbumin, together with a small amount of lactoglobulin, and in the sources of liquid whey available for commercial processing, are in uncoagulated form.

Prior processes for manufacture of dried whey products, can be reviewed as follows: Liquid whey can be dried by spraying into a heated atmosphere in a spray drying apparatus, such as a Gray Jensen or Peebles spray drier. As ordinarily produced in such driers, the lactose of the whey is in anhydrous state and is therefore hygroscopic and cakes when exposed to the atmosphere. The dry product usually contains both the alpha and beta forms of lactose in the anhydrous state, both of which are unstable under atmospheric conditions. This is attributed to the presence of lactose in both alpha and beta forms, prior to drying, in equilibrium corresponding approximately to the temperature and solubility relationships of all substances in the solution. Since the drying is substantially instantaneous, there is practically no opportunity afforded for readjustment of this equilibrium. This phenomenon has been observed and recorded by Bell in "Industrial and Engineering Chemistry", vol. 22, page 53 (1930).

The whey proteins of anhydrous powder produced as described above, are substantially uncoagulated. For reasons which we can not explain, the presence of uncoagulated whey proteins appears to increase hygroscopicity of the powder.

Peebles and Manning Patent 1,928,135 and Eldridge 1,923,427 disclose processes whereby anhydrous spray-dried whey can be converted to a substantially non-hygroscopic stabilized powder. In both instances the powder is treated by the addition of moisture, which is taken on in combination so that the lactose appears in the final product in the form of a monohydrate or $C_{12}H_{22}O_{11}.H_2O$. Where the addition of moisture and formation of the lactose monohydrate are carried out at an elevated temperature as in Peebles and Manning Patent 1,928,135, varying amounts of the whey proteins are coagulated.

In a second type of prior process, exemplified by Simmons 1,763,633 the raw whey is concentrated to approximately 70% solids, and is allowed to set up into a pasty mass during which time the lactose crystallizes and the crystals grow. The crystals are largely alpha lactose monohydrate and therefore stable. Remaining moisture is removed from the pasty mass by different methods such as by spreading it on trays, drying by exposure to warm air, or by spreading it on the surface of a steam heated drum, after which the hard caked mass is ground.

Irrespective of the process used, those familiar with the art have at times experienced great difficulty in producing a satisfactory powder from certain wheys. For example in the spray drying process using certain wheys, the anhydrous powder may at times come out of the drier in somewhat sticky condition as if it contained some syrup. In the other processes described above, the crystals do not form properly and the concentrate does not set up into the desired paste. Operators have been unable to foretell whether or not a particular lot of whey may give difficulty, although it has been observed that fresh whey from the production of casein by the use of a mineral acid, or fresh "Cheddar" cheese whey, gives little or no difficulty in the drying processes, while so-called lactic acid wheys, made by self souring methods or wheys which have developed a high lactic acid content by standing for long periods, usually give considerable difficulty.

Some years past whey was considered a waste product, having little or no commercial value, or at best being used for hog feed. In many places it became such a nuisance that cheese and casein manufacturers were forced to pay to have it hauled away. While such conditions prevailed it was possible for whey manufacturers to select only such raw materials as might be readily processed to produce a marketable dry powdered material. However, in recent years there has been a rising demand for whey powder, and therefore it has been increasingly difficult if not impossible for manufacturers to be discriminating with respect to raw material. Consequently the manufacturers must now seriously consider the processing of wheys which were previously discarded, as for example cottage cheese whey or whey which is sour through a development of a high percentage of lactic acid. In some places, the only whey available is that which has stood for a considerable length of time because of the distance between the producer and the processing plant, and which as previously explained, affords trouble to the processor.

It is an object of our invention to provide a process which will permit the production of a satisfactory, stable, non-caking dry whey powder from any type of raw whey now available on the market.

It is a further object of the invention to provide a process of the above character which will facilitate and permit rapid formation and growth of alpha lactose monohydrate, whereby the final stabilized powder can be obtained without a long period of set.

Further objects of the invention will appear from the following description in which the preferred embodiment of the invention has been set forth in detail, with reference to the accompanying drawing.

The present process is characterized by treatment of raw whey to effect coagulation of whey proteins, prior to crystallization of lactose. It has been previously pointed out that the whey proteins consist principally of lactalbumin, together with a small amount of lactoglobulin. In whole milk such proteins act as protective colloids, in holding casein in colloidal suspension. The presence of uncoagulated whey proteins greatly influences the process of crystallizing lactose, and together with lactic acid and mineral salts, apparently exercises an effect on the equilibrium between alpha and beta lactose in the whey. In any event we have definitely determined that the presence of substantial amounts of uncoagulated whey proteins during or after formation of lactose monohydrate, is a distinct detriment, to production of a satisfactory product. This can be better understood by pointing out that uncoagulated whey proteins, particularly lactalbumin, when mixed with lactose, lactic acid and water, forms a very sticky mass which is difficult to dry and handle. Even in processes utilizing raw material which is fairly easy to process, and in which there may be fairly complete coagulation of whey proteins during the setting or drying steps, the presence of the whey protein in uncoagulated form during at least the initial part of the setting period, serves to retard the rate of setting and the rate of crystal growth.

To coagulate the major part of the whey proteins, prior to crystallization of lactose, we utilize heat treatment of the liquid whey, while the whey contains a mineral acid, such as sulphuric acid, or hydrochloric acid. The temperature required to effect coagulation depends somewhat upon the period of heat treatment, and upon the hydrogen ion concentration. With raw whey difficult to handle by prior processes, and containing a relatively high percentage of lactic acid, we add mineral acid to adjust the hydrogen ion concentration to below pH 4.8 (Sorenson's units) while the temperature of heat treatment can be in the neighborhood of 200 degrees Fahrenheit for a period of about ten minutes. With such values it is possible to effect coagulation of the major part of the whey protein without such undue prolongation of the heat treatment, as to cause caramelization. It is important to avoid caramelization, because a final caramelized product is undesirable, due to its characteristic color and flavor.

We prefer to carry out this heat treatment to effect coagulation of whey proteins, simultaneously with concentration of the raw whey, preparatory to the final stages of the stabilizing process. It is possible however to apply the coagulating step prior to concentration, after which the whey is concentrated and further treated to produce a stabilized dry material. Preliminary coagulation of proteins prior to concentration enables the use of lower temperatures in the concentrating step, which in some instances may be desirable where the concentrating methods utilized require an extended period of heat treatment.

It is also possible to effect coagulation after the concentration operation, but before the formation of lactose crystals. Such practice also enables the use of lower temperatures in the concentrating operation, with a short period of heat treatment after concentration to effect substantial coagulation, as previously explained. We have discovered that an operator should take into account the fact that the pH value of the liquid whey tends to lower, with an increase in concentration. Therefore where mineral acid is being added in the coagulating operation, for example to a whey containing a relatively high percentage of lactic acid, less mineral acid will be required in treatment of concentrated whey, as compared to treatment of the same whey before concentration.

After the coagulating operation and before crystal formation, the whey can, if desired, be partly or completely neutralized by the use of a suitable chemical, such as lime.

As previously indicated definite and predetermined coagulation of whey protein prior to formation of lactose crystals, has a beneficial effect upon crystal formation and growth. This is attributed to the substantial absence of uncoagulated whey proteins or other colloids, which would otherwise tend to interfere with crystal formation. The benefits obtained manifest themselves in the production of a highly stable non-hygroscopic final product, irrespective of the source of whey utilized. The coagulating step also makes possible acceleration of crystal formation. In fact in carrying out our process we prefer to complete crystal formation in a minimum amount of time, simultaneously with removal of water from the material. Thus after production of a liquid whey concentrate, containing say 40% solids, and in which all of the whey proteins have been coagulated as previously described, the concentrate can be directly reduced to a divided stabilized powder by a spray drying operation, as disclosed and claimed in our co-pending application Serial Number 76,236, filed April 24, 1936. In such event there is substantially instantaneous formation of lactose crystals, together with instantaneous removal of moisture to form the final product.

We can also use less rapid methods for further reducing the water content of the whey concentrate, and for causing simultaneous formation of lactose crystals, as for example the process as disclosed and claimed in Peebles co-pending application Serial Number 733,412, filed July 2, 1934, in which stabilized whey powder is mixed with the whey concentrate, to produce a damp granular mix, from which excess moisture is removed in a suitable drier.

Ordinarily the presence of lactose serves to inhibit coagulation of colloids (see Sugars and Their Simple Densities by J. A. Mackenzie, published 1914 by Lippincott, London, page 54). In spite of this inhibiting factor, in our process there is a definite coagulation of whey proteins, so that in turn, whey proteins exert no inhibiting effect upon rapid stabilization.

The part played by mineral salts in our process, can not be explained with certainty. However, it may be stated that the concentration and balance of mineral salts in the whey, plays an important part in enabling rapid formation of whey crystals and formation of a well stabilized product. Also concentration and balance of mineral salts is a material factor in the coagulation of whey protein. In general the mineral salt balance is changed by introduction of acids or salts, and is also affected by changes in concentration of the whey. The addition of mineral acid, like sulphuric acid, to liquid whey containing a relatively high percentage of lactic acid, in the manner previously described, appears to adjust the hydrogen ion concentration to a point required to insure a proper balance of mineral salts, thus enabling the results desired in the present process.

Apparatus such as illustrated in the drawing can be used with good results to effect coagulation of whey proteins simultaneously with concentration by evaporation. This apparatus consists of an evaporator 10, in conjunction with a heater 11. The evaporator can consist of upright evaporator tubes 12, having their upper ends connected with the head 13, and their lower ends connected to a receiver or collector 14. Evaporator tubes 12 are shown enclosed by the steam jacket or heater 16. The liquid whey to be treated is applied to the collector 14 through pipe 17, and under the control of a float valve 18. Vapor from collector 14 is delivered to a suitable condenser, through the vapor conduit 19 and entrainment trap 21. A pump 22 serves to remove liquid from collector 14, and to deliver it through the heater 11 to the evaporator head 13. Assuming a continuous supply of feed material with continuous circulation by pump 22, the concentrated whey can be continuously removed through pipe 23.

In operating the equipment described above, a suitable vacuum is placed upon the evaporator, as for example 24 inches of mercury. Whey is fed through line 17 and pump 22 is started in operation, to circulate the whey through the heater 11, where it is heated under such pressure that no evaporation occurs in the heater itself. From this heater the whey flows into the evaporator head 13, where some evaporation occurs, and thence through tubes 12, where evaporation continues, with delivery of vapor and liquid material to the collector 14. Steam is supplied to heater 11 so that the temperature of liquid whey leaving this heater is sufficiently high to effect the desired coagulation of whey proteins. For example with a whey having a mineral acid content such that when concentrated to 40% solids, it will have a pH value of less than 4.8, good coagulation of the majority of whey proteins will be obtained if the heater elevates the temperature of the whey to say 220° F. Immediately thereafter the temperature of the liquid is reduced in the evaporator. Thus by the use of this equipment one can efficiently carry out coagulation of whey proteins simultaneously with vacuum evaporation and concentration of the whey, without however utilizing such sustained temperatures of treatment as might cause caramelization.

We claim:

1. In a process for producing a dry non-caking whey powder, wherein moisture is removed from the raw whey and the lactose caused to crystallize to form the final product, the improvement comprising effecting coagulation of the major part of the whey proteins before crystallizing the lactose, and causing crystallization of the lactose to take place in the presence of such coagulated proteins.

2. In a process for producing a dry non-caking whey powder, wherein raw liquid whey is concentrated and the lactose content is caused to crystallize in the form of a monohydrate after such concentration, the improvement comprising effecting coagulation of the major part of the whey proteins before crystallizing lactose, and removing moisture from the material simultaneous with crystallizing of the lactose, crystallizing of the lactose taking place in the presence of the coagulated proteins.

3. In a process for producing a dry non-caking whey powder, wherein raw liquid whey is concentrated and the lactose content is caused to crystallize in the form of a monohydrate after such concentration, the improvement comprising effecting coagulation of a major part of the whey proteins before crystallizing lactose, and relatively rapidly removing moisture from the material simultaneously with crystallizing of the lactose to directly produce a divided stabilized material, the coagulated proteins being homogeneously incorporated with the crystallized lactose.

4. In a process for producing a dry non-caking whey powder, wherein the raw liquid whey is first concentrated and then its lactose content caused to crystallize in the form of a monohydrate, the improvement comprising effecting coagulation of the major part of the whey protein simultaneously with the concentration of the whey, said coagulation being effected by heat treatment of the whey, while the whey contains mineral acid and while it has a hydrogen ion concentration of less than pH 4.8, and relatively rapidly effecting further removal of moisture from the material simultaneously with crystallizing of the lactose, whereby the coagulated whey proteins are homogeneously incorporated with the crystallized lactose.

5. In a process for producing a dry non-caking whey powder, wherein raw liquid whey is first concentrated and after such concentration the lactose content is caused to crystallize, the improvement comprising coagulating the major part of the whey proteins during concentration of the whey, and then causing crystallization of the lactose to take place in the presence of such coagulated proteins.

DAVID D. PEEBLES.
PAUL D. V. MANNING.